July 24, 1956 B. J. EDWARDS 2,756,364

TELEVISION TRANSMITTING APPARATUS

Filed Jan. 4, 1952

Inventor
BADEN JOHN EDWARDS
By
Emery, Holcombe & Blair
Attorney

United States Patent Office 2,756,364

Patented July 24, 1956

2,756,364

TELEVISION TRANSMITTING APPARATUS

Baden John Edwards, Cambridge, England, assignor to Pye Limited, Cambridge, England, a British company Application January 4, 1952, Serial No. 264,986

Claims priority, application Great Britain January 5, 1951

2 Claims. (Cl. 315—10)

The present invention relates to television transmitting apparatus employing storage type pick-up tubes with an image converter section, and more particularly to television transmitting apparatus in which the picture is projected onto the storage target during only a fraction of the total frame time, as for example in television film scanning apparatus in which the film picture is projected termittently onto the photo-cathode of an image-iconoscope or an image-orthicon pick-up tube during the frame blanking time, the storage target being scanned during the intervals between frame blanking.

An object of the present invention is to increase the life of the pick-up tube. It is known that the life of the tube is limited by the destruction of the photo-cathode by bombardment with ions due to imperfect vacuum in the tube envelope, these ions being directed onto the photo-cathode by reason of the electrostatic field existing within the tube as a result of the photo-cathode being held at a low negative potential. The production of ions within the tube envelope is partly due to the heat generated within the tube during operation, which heat is partly generated by the focus coil associated with the image-converter section.

According to the present invention, in a television transmitting apparatus incorporating a pick-up tube of the kind above referred to in which the picture is projected onto the storage target for only a fraction of the total frame time, the energisation of the photo-cathode and/or the focussing coil of the image-converter section is/are interrupted or considerably reduced during at least a part of the frame period during which the picture does not have to be projected onto the storage target. From another aspect of the invention, the image-converter section of the pick-up tube is only maintained in operation approximately for the duration of the times that the picture is being stored on the storage target.

The invention can be carried into effect by applying the polarising potential to the photo-cathode in pulses during those intervals when the image-converter section of the tube has to operate, whereby the electrostatic field is eliminated for a proportion of the total operating time of the tube and during which ion bombardment of the photo-cathode is substantially eliminated with consequential increase in the tube life. In addition, or alternatively, the image focussing coil of the image-converted section of the tube is only energised in pulses, whereby the heat generated within the tube is by the focussing coil will be reduced with consequential reduction in the ionisation of the imperfect vacuum within the tube envelope.

Figure 1:
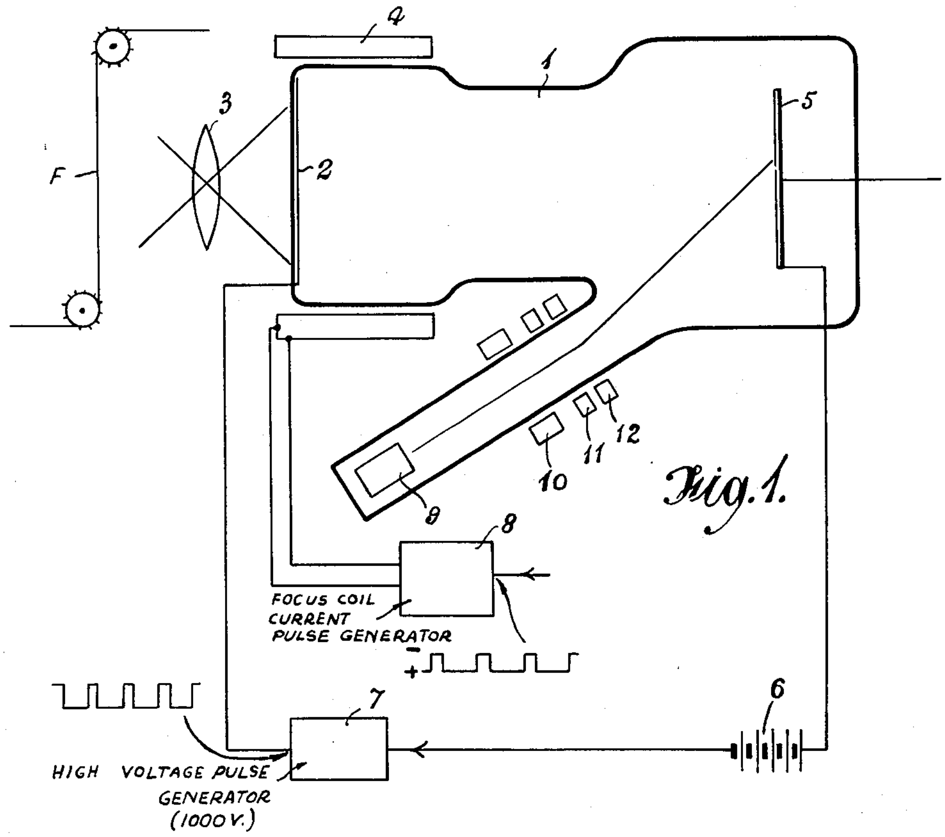
Figure 2:
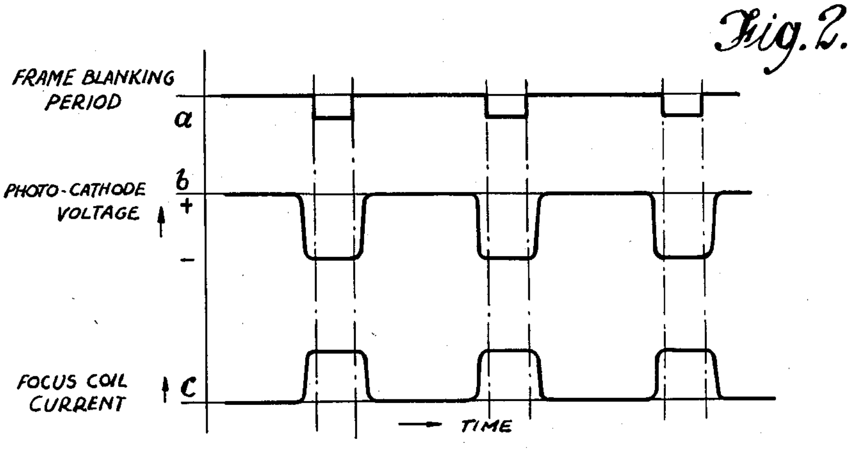

In order that the invention may be more clearly understood, reference will now be made to the accompanying drawing in which:

Fig. 1 illustrates a schematic arrangement showing the pulsing of the image-converter section of a pick-up tube, and Fig. 2 shows curves indicating the timing of the pulsing.

In Fig. 1 the pick-up tube 1 is diagrammatically illustrated as of the image-ionoscope type of which the image-converter section comprises a photo-cathode 2 on the end wall of the tube, onto which the picture to be transmitted, for example from a cinema film F, is projected through the optical system 3. 4 is the focussing coil associated with the image-converter section.

According to the present invention, the photo-cathode 2 is pulsed negatively only during those time intervals when the film is being projected onto the photo-cathode, namely during the frame blanking intervals. The photo-cathode 2 is negatively biassed with respect to the charge storage surface 5 by means of a source of potential schematically illustrated as battery 6, but the source 6 is connected to a high voltage pulse generator 7 so that the photo-cathode 2 is pulsed negatively only during the frame blanking periods. Simultaneously with the pulsing of the photo-cathode, focus control current is fed in pulses through the focus coil 4 from the current pulse generator 8. The pulse generators 7 and 8 may be of any kind known in the art. Such generators are so well-known that it is not considered necessary to illustrate them in the accompanying drawings.

The voltage and current pulses applied to the photo-cathode and focus coil respectively have to be of a sufficient time duration so that the tube will be at full operating condition during the picture projection, and to allow for necessary build-up times these voltage and current pulses have a time duration slightly exceeding the frame blanking period during which picture projection takes place. This is indicated in Figure 2 in which curve *a* shows the frame blanking periods and surves *b* and *c* show the voltage and current pulses applied to the photo-cathode and focus coil respectively.

One of the improvements that the invention effects is that since the current supply to the focussing coil is cut off whilst the charge storage surface is being scanned, there is no electrostatic field to influence the scanning beam, and this improves the picture quality. Scanning of the charge storage surface 5 is effected in conventional manner by an electron gun schematically shown at 9 controlled by focussing coil 10 and vertical and deflection scanning coils 11 and 12 respectively.

The storage target of the tube may also be biassed by the pulsing method described in co-pending application Serial No. 160,636 filed May 8, 1950, now Patent No. 2,651,674.

Whilst the invention is particularly applicable to television film scanners, it will be understood that it is also applicable to other television transmitting apparatus in which the picture is projected onto the storage surface for only a fraction of the frame time, for example as in the system described in co-pending application Serial No. 160,636.

I claim:

1. Television transmitting apparatus incorporating a television pick-up tube comprising an evacuated envelope, an image-converter section at one end of said envelope for converting a light image projected onto it into electrons, a charge storage element having a charge storage surface at the other end of said envelope, said image-converter section comprising a photo-cathode and a focus coil for focussing said electrons onto said charge storage surface, means for scanning said charge storage surface with a beam of high-velocity electrons during frame periods that each comprise an effective scanning period and a frame blanking period, means for biassing said photo-cathode negatively with respect to said charge storage surface, means for energising said focus coil, and electrical pulsing means connected to the energising means for said focus coil and operative to energise said image-converter section only during said frame blanking periods.

2. Television transmitting apparatus incorporating a television pick-up tube comprising an evacuated envelope, a photo-cathode at one end of said envelope for converting a light image projected onto it into electrons, a charge storage element having a charge storage surface at the opposite end of said tube, a focus coil adjacent said photo-cathode for focussing the electrons emitted by said photo-cathode onto said charge storage surface, means for biassing said photo-cathode negatively with respect to said charge storage surface, means for scanning said charge storage surface with a beam of high-velocity electrons during a frame period that is divided up into an effective scanning period and a frame blanking period, means for energising said focus coil, electrical pulsing means connected to the energising means for said focus coil, and electrical pulsing means connected to said biassing means for said photo-cathode, said pulsing means severally operating to apply energy to said focus coil and said photo-cathode only during said frame blanking period.

References Cited in the file of this patent

UNITED STATES PATENTS

| | | |
|---|---|---|
| 2,083,995 | Henroteau | June 15, 1937 |
| 2,146,822 | Henroteau | Feb. 14, 1939 |
| 2,244,466 | Lubszynski et al. | June 3, 1941 |
| 2,258,728 | Bedford | Oct. 14, 1941 |
| 2,611,820 | Somers | Sept. 23, 1952 |